C. W. BRIGGS.
CAR TRUCK.
APPLICATION FILED JAN. 18, 1916.

1,179,798.

Patented Apr. 18, 1916.
3 SHEETS—SHEET 1.

Witnesses

Inventor
C. W. Briggs,
By Victor J. Evans
Attorney

C. W. BRIGGS.
CAR TRUCK.
APPLICATION FILED JAN. 18, 1916.

1,179,798.

Patented Apr. 18, 1916.
3 SHEETS—SHEET 2.

Witnesses

Inventor
C. W. Briggs,
By Victor J. Evans
Attorney

C. W. BRIGGS.
CAR TRUCK.
APPLICATION FILED JAN. 18, 1916.
1,179,798.
Patented Apr. 18, 1916.
3 SHEETS—SHEET 3.
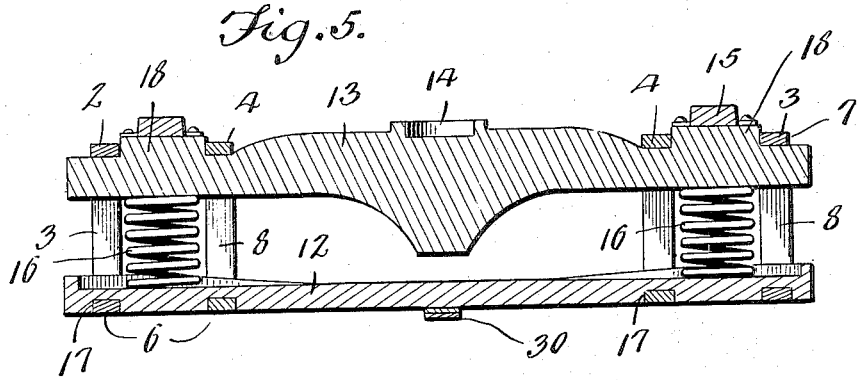
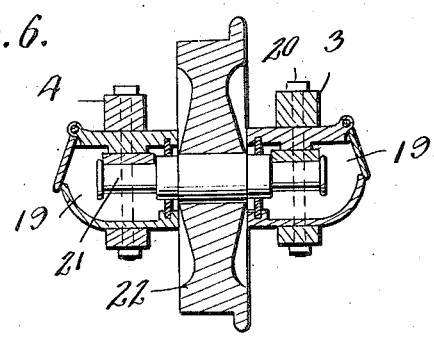
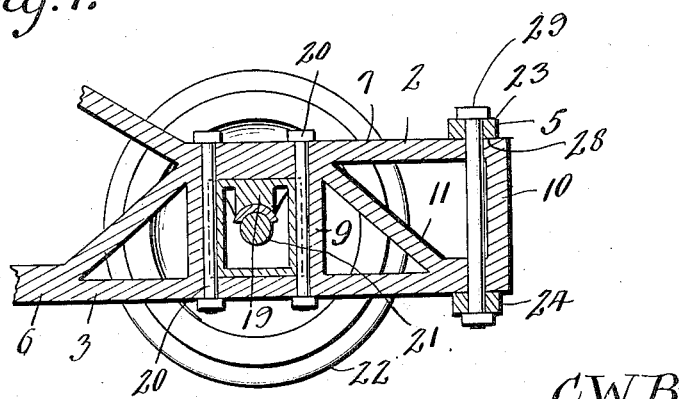
Inventor
C. W. Briggs,
Witnesses
By Victor J. Evans
Attorney

UNITED STATES PATENT OFFICE.

CALVIN W. BRIGGS, OF BATON ROUGE, LOUISIANA.

CAR-TRUCK.

1,179,798.  Specification of Letters Patent. Patented Apr. 18, 1916.

Application filed January 18, 1916. Serial No. 72,824.

*To all whom it may concern:*

Be it known that I, CALVIN W. BRIGGS, a citizen of the United States, residing at Baton Rouge, in the parish of East Baton Rouge and State of Louisiana, have invented new and useful Improvements in Car-Trucks, of which the following is a specification.

This invention relates to certain new and useful improvements in car trucks, particularly railway car trucks, and one of its objects is to provide a car truck which is stronger and more durable than the type of trucks in common use, and in which each wheel is journaled for rotation independently of the other, thus allowing the wheels at opposite sides of the truck to run at different rates of speed, so that curves may be turned with greater freedom of running motion and without the strains ordinarily produced in rigid and non-rigid trucks of ordinary construction.

A further object of the invention is to provide a truck in which the wheels and their axles are journaled for rotation in independent bearing boxes in such a manner that either wheel and its axle may be applied and removed independently of the others, thus obviating the necessity of removing more than one wheel in the event of the breaking of an axle or wheel or the wearing away of the same to such a degree as to require replacement.

A still further object of the invention is to provide a construction of truck which will support greater weight and sustain greater stresses and strains than trucks of ordinary construction, and with materially less danger of liability of injury thereto.

A still further object of the invention is to provide a section or truck the component parts of which may be readily assembled and disassembled, which may be used interchangeably with other trucks, and the essential features of which may be applied to some forms of ordinary trucks to convert the same into trucks embodying the principles of the present invention.

With these and other objects in view, the invention consists of the features of construction, combination and arrangement of parts herein fully described and claimed, reference being had to the accompanying drawings in which:—

Figure 1:
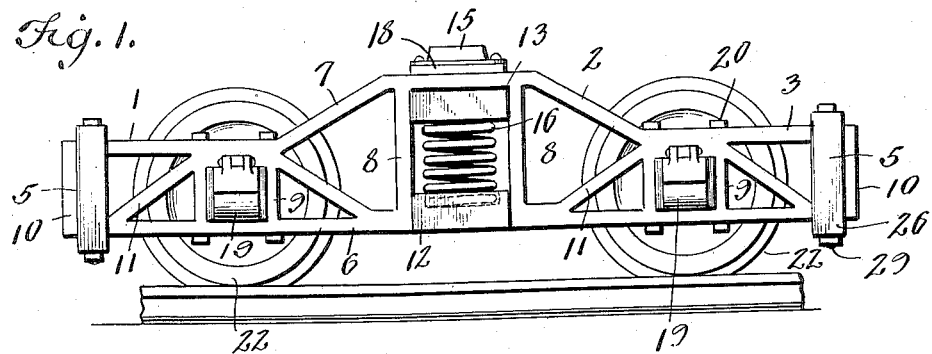
Figure 2:
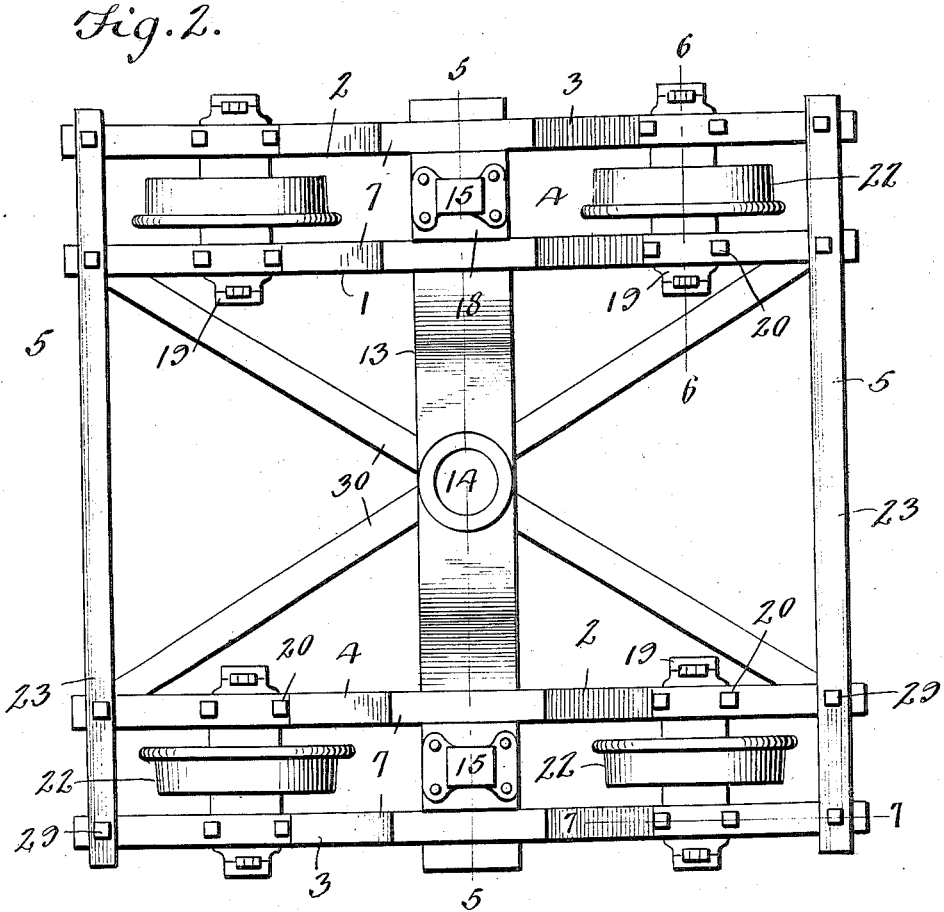
Figure 3:
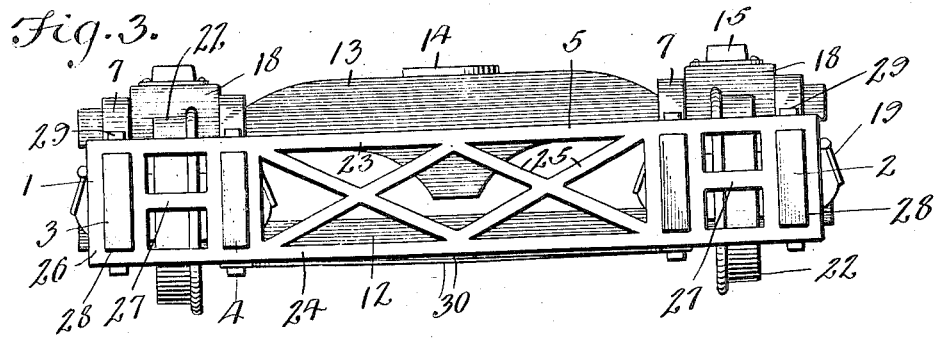
Figure 4:
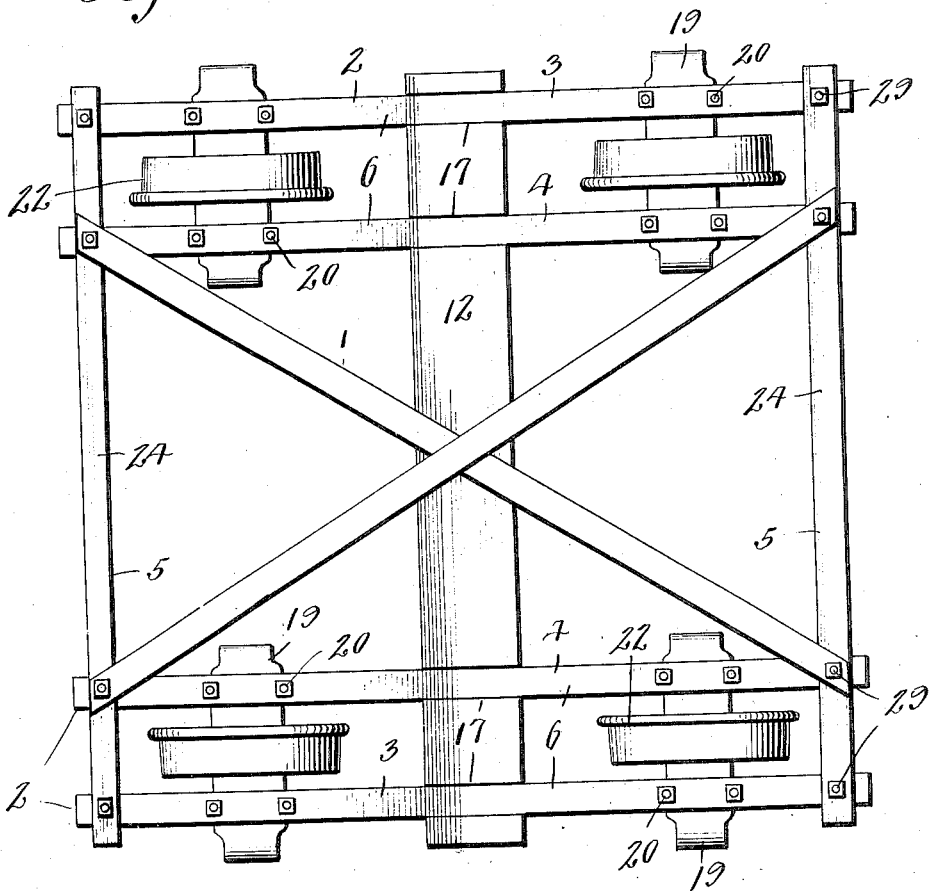

Figure 1 is a side elevation of a car truck embodying my invention. Fig. 2 is a top plan view of the same. Fig. 3 is an end elevation. Fig. 4 is a bottom plan view. Fig. 5 is a vertical transverse section through the center of the truck taken on the line 5—5 of Fig. 2. Fig. 6 is a sectional view on an enlarged scale through the truck frame and one of its wheels and bearings, as indicated by the line 6—6 of Fig. 2. Fig. 7 is a detail section on the line 7—7 of Fig. 2, through one of the plates of one of the side frames and one of the journal boxes.

Referring to the drawings, 1 designates my improved truck, which comprises side frames 2, each consisting of a pair of parallel side plates or pieces 3 and 4 and end pieces 5, together with other connecting parts, as hereinafter fully described.

As shown, the side plates or pieces 3 and 4 of each side frame 2 are alike in construction and are of skeleton formation, each consisting of a bottom bar or rail 6 a top bar or rail 7 intermediate uprights 8, sets of end uprights 9, upright end pieces 10 and diagonal struts or braces 11, this construction being preferred, although it may be departed from to certain extents within the scope of the appended claims to suit different conditions or requirements of service.

The intermediate uprights 8 form, with the bottom and top bars 6 and 7, openings and guideways to receive the ends of the transverse bolster supporting bar 12 and the bolster 13, which latter is provided with the usual center and side bearings 14 and 15 respectively. The ends of the bolster supporting bar 12 are cupped or channeled to receive the bolster supporting spring 16 on which the ends of the bolster rest, and are provided with grooves 17 in their undersides to receive and engage the underlying portions of the bottom bar 6, whereby said bolster supporting bar is held in position. The ends of the bolster 13 are reduced and pass through and are movable in the alined openings or guideways of the pairs of side pieces 3 and 4, and are provided with lugs or projections 18 adapted to fit between the side pieces, which lugs serve as elements to guide the bolster in its movements as well as retaining members to hold the bolster against any possibility of longitudinal displacement.

The end uprights 9 form sockets or openings to receive the ends of journal boxes 19 which fit therein and extend therethrough and which are grooved in their sides to receive bolts 20 which extend between the top and bottom rails 6 and 7 and hold the boxes from longitudinal displacement. The sets of journal boxes upon the side pieces of the side frames support axles 21 carrying the truck wheels 22, which axles and wheels are mounted independently of each other, as shown. Hence it will be seen that each wheel is mounted for independent rotation, and that the wheels at either side of the truck may rotate with greater speed than the wheels at the opposite side of the truck to facilitate the turning motion of the truck in rounding curves, and to reduce the stresses and strains otherwise falling upon the axles and parts of the truck frame, furthermore, this construction adapts any axle or wheel, when worn or broken, to be removed without disturbing any of the others, the advantages of which will be readily understood. This construction dispenses with the long transverse axles commonly employed, and each of which usually supports two wheels, and which are liable to break or snap under the sheer strains produced in the running of the truck through variations in the movements of the component parts thereof. It will be observed that with the construction described the wheels are also arranged between and guarded by the side pieces of each side frame, thus diminishing liability of injury thereto and also holding the wheels against any possibility of spreading motion.

The end pieces 5 of the truck are provided to unite and tie the outer ends of the side pieces of the side frames, and each preferably consists of an open skeleton plate or casting formed of top and bottom bars or rails 23 and 24, crossed braces 25, and sets of upright end pieces 26, connected by bracing webs 27, said end pieces forming sockets or openings 28 to receive the ends of the side pieces of the side frames, which are fastened to the end pieces by bolts 29 extending through said side and end pieces. By this construction further provision is made for holding the side pieces of the side frames rigid and in parallel relation and prevent any tendency of the parts named to spread, while permitting of the setting up or taking down of the parts of the truck frame in a ready and convenient manner, allowing trucks of the construction set forth to be easily constructed and repaired. If desired, the crossed braces 30 may be provided upon the underside of the truck and extended diagonally between the ends of the inner side pieces of the side frames and connected with the associated bolts, whereby still further strength and durability will be secured.

It will be evident from the foregoing description that the invention provides a construction of truck which is not only of a simple character and no more costly of construction than ordinary trucks, but which provides for the mounting of the wheels on separate axles, whereby the advantages stated are secured, and which also provides for the incorporation of side frames of increased strength, by which the strength of the truck as a whole and its weight carrying capacity are materially increased. Furthermore, the construction described serves other advantages, as hereinbefore stated, and adapts the truck to be more readily repaired when occasion requires with less expense than is necessary in the use of ordinary trucks, since in the breaking of an axle, for instance, the substitution of but a single short axle in place of a long one, and the removal of but a single wheel in place of two wheels insures both economy of material and labor. The outer side plates and end pieces may be applied to trucks of ordinary construction where such construction admits, to convert the same into trucks embodying the general principles of the present invention, thus avoiding the necessity of discarding trucks in use where a conversion of the character set forth is permissible.

I claim:—

1. A railway car truck comprising side frames, each consisting of a pair of side pieces, said side pieces being of skeleton formation and formed to provide intermediate and end sets of receiving openings, end pieces having openings receiving the ends of the side pieces of the end frames, fastenings uniting said parts, a notched bolster supporting bar passing through and fitted in the intermediate openings of the side frames and engaging the bottom portions thereof, a bolster spring supported on said bar and also fitted at its ends in said openings, said bolster having projections extending into the spaces between the side pieces of the side frames to hold it from displacement, journal boxes fitted in the end openings of the side frames, and provided with grooves, fastenings engaging said grooves and the side pieces of the side frames and securing said journal boxes in position, separate and independent axles journaled in the sets of journal boxes, and wheels carried by said axles and disposed in the spaces between the pieces of the side frames.

2. A railway car truck comprising side frames, each consisting of a pair of side pieces, said side pieces being of skeleton formation and formed to provide intermediate and end sets of receiving openings, end pieces having openings receiving the ends of the side pieces of the end frames, fastenings uniting said parts, a notched bolster supporting bar passing through and fitted in the intermediate openings of the side frames and engaging the bottom portions thereof, a bolster spring supported on said bar and also fitted at its ends in said openings, said bolster having projections extending into the spaces between the side pieces of the side frames to hold it from displacement, journal boxes fitted in the end openings of the side frames, and provided with grooves, fastenings engaging said grooves and the side pieces of the side frames and securing said journal boxes in position, separate and independent axles journaled in the sets of journal boxes, crossed braces upon the underside of the central portion of the truck frame, and fastenings uniting said braces to the frame.

In testimony whereof I affix my signature in presence of two witnesses.

CALVIN W. BRIGGS.

Witnesses:
HERMANN MAYSE,
WARREN SWARTZ.